United States Patent
Liu et al.

(10) Patent No.: US 11,943,667 B2
(45) Date of Patent: Mar. 26, 2024

(54) METHOD AND BASE STATION FOR MULTI-USER MULTIPLE INPUT MULTIPLE OUTPUT

(71) Applicant: Telefonaktiebolaget LM Ericsson (publ), Stockholm (SE)

(72) Inventors: Chunhui Liu, Beijing (CN); Zhitao Liu, Guangdong (CN); Jingye Li, Beijing (CN); Zhiyi Zong, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 400 days.

(21) Appl. No.: 17/299,977

(22) PCT Filed: Dec. 13, 2018

(86) PCT No.: PCT/CN2018/120960
§ 371 (c)(1),
(2) Date: Jun. 4, 2021

(87) PCT Pub. No.: WO2020/118636
PCT Pub. Date: Jun. 18, 2020

(65) Prior Publication Data
US 2021/0385695 A1 Dec. 9, 2021

(51) Int. Cl.
*H04W 28/26* (2009.01)
*H04B 7/0452* (2017.01)

(52) U.S. Cl.
CPC .......... *H04W 28/26* (2013.01); *H04B 7/0452* (2013.01)

(58) Field of Classification Search
CPC .............................. H04B 7/0452; H04W 28/26
See application file for complete search history.

(56) References Cited

U.S. PATENT DOCUMENTS

| 5,838,671 A | * | 11/1998 | Ishikawa | H04W 72/00 370/335 |
|---|---|---|---|---|
| 8,116,698 B2 | | 2/2012 | Hedayat et al. | |
| 9,094,064 B2 | | 7/2015 | Alex et al. | |

(Continued)

FOREIGN PATENT DOCUMENTS

| CN | 102404028 A | 4/2012 |
|---|---|---|
| CN | 103427888 A | 12/2013 |

(Continued)

OTHER PUBLICATIONS

3GPP, "3rd Generation Partnership Project; Technical Specification Group Radio Access Network; NR; Physical layer procedures for control (Release 15)", 3GPP TS 38.213 V15.1.0, Mar. 2018, 1-77.

(Continued)

*Primary Examiner* — Stephen J Clawson
(74) *Attorney, Agent, or Firm* — Christopher & Weisberg, P.A.

(57) ABSTRACT

A method and a base station are disclosed for multi-user multiple input multiple output (MU-MIMO). According to an embodiment, a base station obtains historical scheduling characteristic information. The base station reserves resources for MU-MIMO users based at least on the historical scheduling characteristic information. The base station allocates the reserved resources to the MU-MIMO users.

18 Claims, 5 Drawing Sheets

(56) References Cited

U.S. PATENT DOCUMENTS

| | | | |
|---|---|---|---|
| 9,178,589 B2 | 11/2015 | Chen et al. | |
| 10,771,128 B1* | 9/2020 | Sitaram | H04W 64/006 |
| 2004/0223504 A1* | 11/2004 | Wybenga | H04L 45/60 |
| | | | 370/412 |
| 2008/0132281 A1 | 6/2008 | Kim et al. | |
| 2008/0186918 A1* | 8/2008 | Tinnakornsrisuphap | |
| | | | H04W 8/04 |
| | | | 370/331 |
| 2008/0214198 A1* | 9/2008 | Chen | H04L 1/003 |
| | | | 455/452.2 |
| 2011/0194593 A1* | 8/2011 | Geirhofer | H04W 72/51 |
| | | | 375/224 |
| 2012/0238283 A1* | 9/2012 | Tian | H04W 72/20 |
| | | | 455/452.1 |
| 2013/0329559 A1* | 12/2013 | Cabrera | H04W 28/0284 |
| | | | 370/235 |
| 2015/0237617 A1 | 8/2015 | Chen | |
| 2015/0351028 A1 | 12/2015 | Vallath et al. | |
| 2016/0119866 A1* | 4/2016 | Miyagi | H04W 52/0206 |
| | | | 370/311 |
| 2016/0277973 A1 | 9/2016 | Luo et al. | |
| 2019/0164319 A1* | 5/2019 | Callender | G06T 11/60 |

FOREIGN PATENT DOCUMENTS

| | | |
|---|---|---|
| CN | 104936233 A | 9/2015 |
| CN | 106685494 A | 5/2017 |
| WO | 2011160387 A1 | 12/2011 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.1.0, Mar. 2018, 1-268.

Panasonic, "Resource reservation for NR DL and UL", 3GPP TSG RAN WG1 Meeting 90bis, R1-1718290, Prague, CZ, Oct. 9-13, 2017, 1-4.

EPO Communication with Supplementary European Search Report dated Apr. 14, 2022 for Patent Application No. 18943268.5, consisting of 8-pages.

* cited by examiner

| | Proportion of users with this single service | Number of users with this single service | File size (MB) | Package size (Byte) | Period (s) | Traffic of this single service in 60s (MB) | Proportion of the traffic |
|---|---|---|---|---|---|---|---|
| WeChat (sending text) | 42% | 155 | 0.00035 | 70 | 5 | 5.150 | |
| WeChat (sending voice) | 10% | 37 | 0.00977 | 500 | 10 | 17.344 | 78% |
| WeChat (sending image) | 11% | 41 | 0.07813 | 1024 | 20 | 76.313 | |
| WeChat (sending video) | 4% | 15 | 3.00000 | 1024 | 100 | 213.120 | |
| ACK feedback | | | | | | 62.042 | 15% |
| VoLTE service (activation ratio: 0.5) | 10% | 38 | | | | 26.552 | 7% |
| Total UL traffic | 77% | 248 | | | | 400.520 | |
| UL service rate | | | | | | 6.675 | |
| WeChat (receiving text) | 42% | 155 | 0.00035 | 70 | 5 | 5.150 | |
| WeChat (receiving voice) | 10% | 37 | 0.00977 | 500 | 10 | 17.344 | 29% |
| WeChat (receiving image) | 11% | 41 | 0.07813 | 1024 | 20 | 76.313 | |
| WeChat (receiving video) | 4% | 15 | 3.00000 | 1024 | 100 | 213.120 | |
| FTP download | 2% | 7 | 4.00000 | 1024 | 200 | 71.040 | 7% |
| WEB browse | 20% | 74 | 0.40000 | 500 | 30 | 473.600 | 45% |
| Streaming media service | 1% | 4 | 6.00000 | 1024 | 60 | 177.600 | 17% |
| VoLTE service (activation ratio: 0.5) | 10% | 38 | | | | 26.552 | 3% |
| Total DL traffic | 100% | 371 | | | | 1060.718 | |
| DL service rate | | | | | | 17.679 | |

FIG. 5

METHOD AND BASE STATION FOR MULTI-USER MULTIPLE INPUT MULTIPLE OUTPUT

TECHNICAL FIELD

Embodiments of the disclosure generally relate to wireless communication, and, more particularly, to a method and a base station for multi-user multiple input multiple output (MU-MIMO).

BACKGROUND

This section introduces aspects that may facilitate better understanding of the present disclosure. Accordingly, the statements of this section are to be read in this light and are not to be understood as admissions about what is in the prior art or what is not in the prior art.

Massive MIMO (also known as large-scale antenna system, very large MIMO, hyper MIMO, full-dimension MIMO, or ARGOS) makes a clean break with the current practice through the use of a very large number (e.g., hundreds or thousands) of service antennas that are operated fully coherently and adaptively. Extra antennas help by focusing the transmission and reception of signal energy into ever-smaller regions of space. This brings huge improvements in throughput and energy efficiency, in particularly when combined with simultaneous scheduling of a large number (e.g., tens or hundreds) of user terminals.

Multi-user MIMO (MU-MIMO) can leverage multiple users as spatially distributed transmission resources, at the cost of somewhat more expensive signal processing. In comparison, conventional or single-user MIMO only considers multiple antenna dimensions of the local device. MU MIMO algorithms are developed to enhance MIMO systems when the number of users or connections is greater than one. MU MIMO can be generalized into two categories: MIMO broadcast channels (MIMO BC) and MIMO multiple access channels (MIMO MAC) for downlink and uplink situations, respectively. Single-user MIMO can be represented as point-to-point, pairwise MIMO.

MU massive MIMO is a key technology of 4.5 generation (4.5G) massive MIMO long term evolution (LTE) and 5G new radio (NR). It is expected to handle the huge increase in data usage. Its ability to serve multiple users (and thus, multiple devices) simultaneously within a condensed area while maintaining fast data rates and consistent performance makes it the perfect technology to address the needs of the forthcoming 4.5G/5G era.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for MU-MIMO.

According to a first aspect of the disclosure, there is provided a method in a base station. The method comprises obtaining historical scheduling characteristic information and reserving resources for MU-MIMO users based at least on the historical scheduling characteristic information. The method further comprises allocating the reserved resources to the MU-MIMO users.

According to the above embodiment, the massive MIMO gain can be improved.

In an embodiment of the disclosure, the resources may be reserved for the MU-MIMO users based further on current resource demand information.

In an embodiment of the disclosure, reserving the resources for the MU-MIMO users may comprise determining a number of the MU-MIMO users for which the resources are reserved. Reserving the resources for the MU-MIMO users may further comprise determining a number of control channel element (CCE) candidates reserved for the MU-MIMO users. Reserving the resources for the MU-MIMO users may further comprise determining a number of physical resource blocks (PRBs) reserved for the MU-MIMO users and then reserving CCE resources and PRBs based on the determined number of CCE candidates and the determined number of PRBs respectively.

In an embodiment of the disclosure, the method may further comprise allocating at least part of unreserved resources to one or more non-MU-MIMO users.

In an embodiment of the disclosure, the method may further comprise determining whether to use MU-MIMO based on at least one of the historical scheduling characteristic information and current resource demand information. The resources may be reserved for the MU-MIMO users when it is determined to use MU-MIMO.

In an embodiment of the disclosure, obtaining the historical scheduling characteristic information may comprise determining the historical scheduling characteristic information based on historical information related to historical scheduling events.

In an embodiment of the disclosure, the historical information related to a historical scheduling event may comprise historical resource demand information and historical scheduling result information.

In an embodiment of the disclosure, the historical resource demand information may comprise one or more of: a number of active users existing in a serving area of the base station, and buffer status of the active users.

In an embodiment of the disclosure, the historical scheduling result information may comprise one or more of: a number of users scheduled in the historical scheduling event; a number of MU-MIMO users among the scheduled users; a number of non-MU-MIMO users among the scheduled users; a number of CCE candidates assigned in the historical scheduling event; a number of PRBs allocated in the historical scheduling event; a number of PRBs allocated to MU-MIMO users in the historical scheduling event; a number of PRBs allocated to non-MU-MIMO users in the historical scheduling event; and an instantaneous throughput achieved in the historical scheduling event.

In an embodiment of the disclosure, the historical scheduling characteristic information may comprise one or more of: traffic model information, bottleneck information, and statistical information about the historical scheduling result information.

In an embodiment of the disclosure, the traffic model information may comprise one or more of: a number of users demanding dense traffic; a number of users with voice services; a number of users with small package services; and a number of users with middle package services.

In an embodiment of the disclosure, the bottleneck information may comprise one or more of: a maximum number of users capable of being scheduled by the base station; a maximum number of CCE candidates available for the base station; and a maximum number of PRBs available for the base station.

In an embodiment of the disclosure, the statistical information may comprise one or more of: an average number of scheduled users; an average number of assigned CCE candidates; an average number of allocated PRBs; an average number of PRBs allocated to MU-MIMO users; and an average number of PRBs allocated to non-MU-MIMO users.

In an embodiment of the disclosure, it may be determined to use MU-MIMO when following conditions are satisfied: a number of users demanding dense traffic is above a first predetermined threshold; an average number of PRBs allocated to MU-MIMO users is below a second predetermined threshold; and a number of users with small package services is below a third predetermined threshold.

In an embodiment of the disclosure, it may be determined not to use MU-MIMO when one or more of following conditions are satisfied: a number of users demanding dense traffic is smaller than a first predetermined threshold; a number of users with small package services is greater than a third predetermined threshold; and a number of active users is below a fourth predetermined threshold.

In an embodiment of the disclosure, the number of the MU-MIMO users may be determined as a first predetermined margin multiplied by a difference between a maximum number of users capable of being scheduled and an average number of scheduled users. The number of the reserved CCE candidates may be determined as a second predetermined margin multiplied by a difference between a maximum number of CCE candidates and an average number of assigned CCE candidates. The number of the reserved PRBs may be determined as a third predetermined margin multiplied by a difference between a maximum number of PRBs and an average number of allocated PRBs.

According to a second aspect of the disclosure, there is provided a base station. The base station may comprise at least one processor and at least one memory. The at least one memory may contain instructions executable by the at least one processor, whereby the base station may be operative to obtain historical scheduling characteristic information. The base station may be further operative to reserve resources for MU-MIMO users based at least on the historical scheduling characteristic information. The base station may be further operative to allocate the reserved resources to the MU-MIMO users.

In an embodiment of the disclosure, the base station may be operative to perform the method according to the first aspect.

According to a third aspect of the disclosure, there is provided a computer program product. The computer program product may comprise instructions which when executed by at least one processor, cause the at least one processor to perform the method according to the above aspect.

According to a fourth aspect of the disclosure, there is provided a computer readable storage medium. The computer readable storage medium may comprise instructions which when executed by at least one processor, cause the at least one processor to perform the method according to the above aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 5 shows an exemplary traffic model which may be obtained according to an embodiment of the disclosure.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
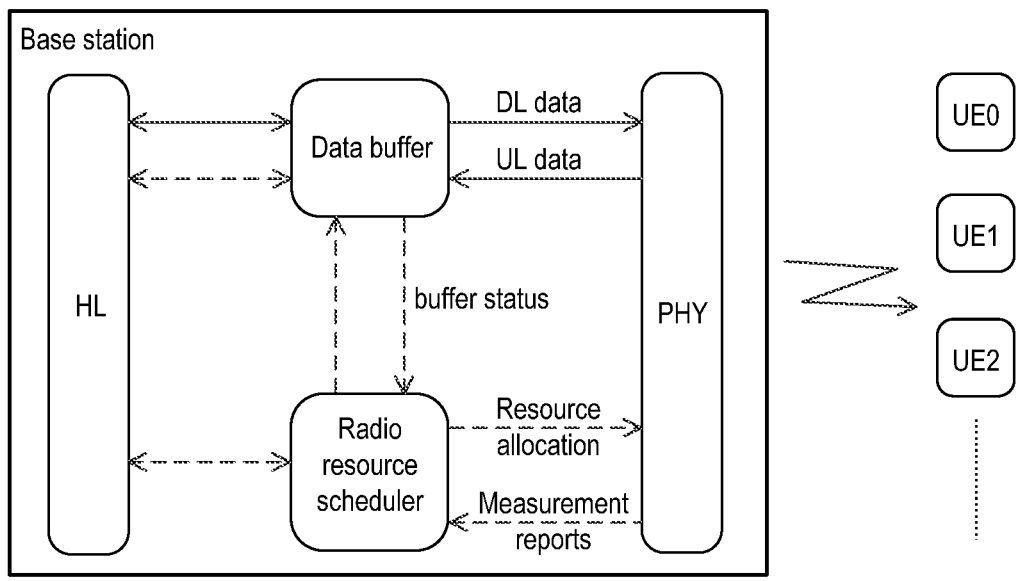
FIG. 1 is a diagram showing an existing wireless communication system into which MU-MIMO is applicable.

FIG. 1 is a diagram showing an existing wireless communication system into which MU-MIMO is applicable. The wireless communication system may be a time division duplexing (TDD) system in LTE 4G or NR 5G. As shown, the wireless communication system comprises a base station and a plurality of user equipments (UEs). In the base station, the high layer (HL) conveys data and signaling with the physical layer (PHY). The HL refers to open system interconnection (OSI) layers above layer 2 and the PHY refers to OSI layer 1. The data buffer stores uplink (UL) and downlink (DL) data for UE. The radio resource scheduler assigns radio resource to UE. According to the allocation results, the data buffer prepares data for the PHY and the PHY transmits data to or receives data from UE. The PHY takes care of channel measurement and reports to the scheduler the measurement results which are input arguments to scheduling algorithms. UE shall follow the configuration and scheduling for radio resource from the base station.

Figure 2:
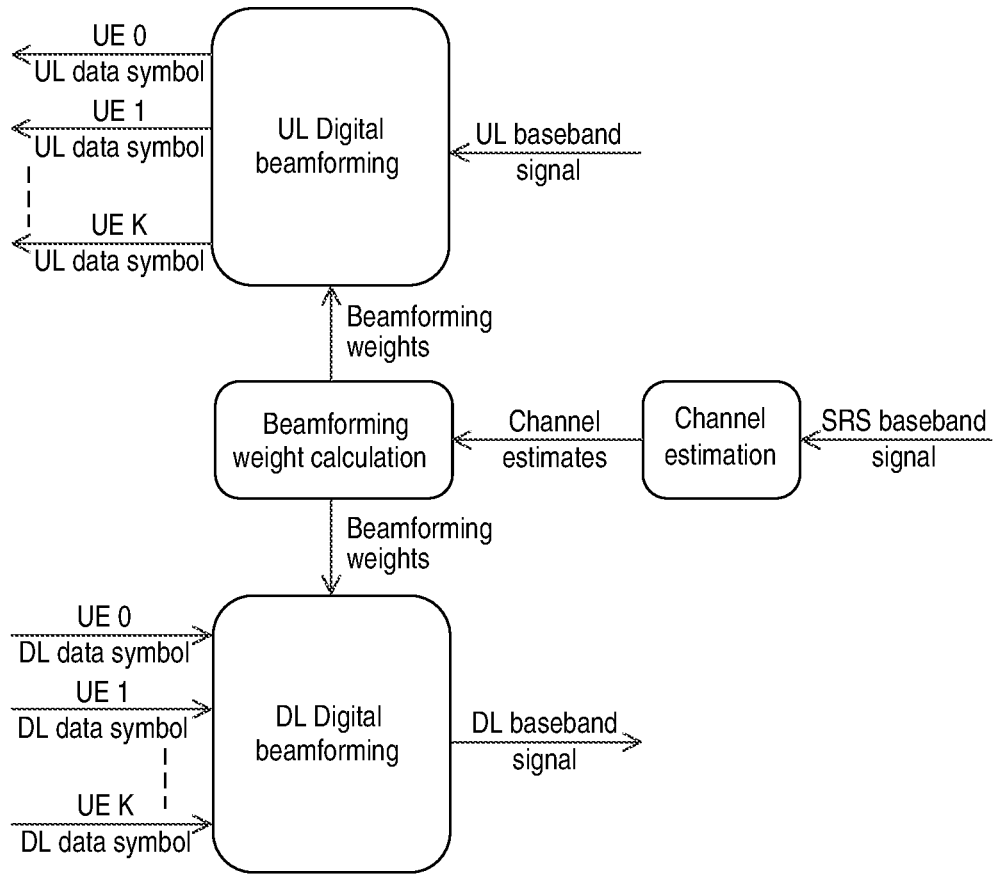
FIG. 2 illustrates an existing implementation for dynamic beamforming.

In practice, channel knowledge may not be perfect. Channel estimation error is introduced by interference and/or noise. Another impact is time variation of channels. During the period between channel measurement and beamformed transmission, channels are still varying. If the channel varies much, beamforming gain becomes negligible. FIG. 2 illustrates an existing implementation for dynamic beamforming. As shown, sounding reference signal (SRS) signals from different UEs are received by a base station. Then, channels for different UEs can be individually estimated. According to the channel estimates, the beamforming weights for UL and DL may be calculated respectively. Then, the digital beamforming is applied for UL and DL. The reference signals used in FIG. 2 may raise potential limitations or performance loss for beamforming.

On the other hand, channel measurement can be performed by measuring physical uplink shared channel (PUSCH). The issue of channel time variance remains for downlink beamforming, since the downlink beams are calculated or selected based on the measurement over uplink PUSCH. There may exit two cases. One is that only downlink physical downlink shared channel (PDSCH) is scheduled for a certain user during a period within which no PUSCH occurs for this user. The other is that even though PUSCH is scheduled while different PRBs are used for PDSCH.

In practical networks, one cell may accommodate hundreds of UEs. Voice services or text services are provided for many UEs. Due to the limitations on channel measurement mentioned above, SRS resources become precious and thus are allocated to UE with big data buffer to increase cell throughput. It is not worthy to perform dynamic beamforming for UE with low traffic demand.

However, due to the limitations of criteria for assigning SRS resources, there are not so many UEs with dense traffic demand. Thus, the gain of MU massive MIMO may be very likely diluted. For example, for massive MIMO downlink, suppose that: 1) the system allows for assigning the same radio time and frequency resource to up to 8 UEs; 2) there are 200 UEs and 8 of them have dense traffic and are assigned with SRS resources while other UEs demand only small package transmission from time to time; 3) due to some hardware (HW) limitations, one base station can schedule up to 20 users per transmission opportunity per cell; 4) round-robin scheduling is adopted. Then all UEs may be scheduled once every (around) 10 times. Among them, 8-layer gain may be achieved once by scheduling that MU group. The massive MIMO gain can be roughly estimated as:

8(number of layers)/10(times)+1/10*9=1.7, which is quite lower than the maximum gain of 8. Note that although this example is quite rough, it is used to only illustrate the average of massive MIMO gain over time.

The issue above is induced by the combination of SRS and UE traffic load. Although there have been some solutions which can resolve this issue, those solutions require large memory to store channel measurements and induce high complexity on system design. Moreover, if a UE demands only DL services but no UL services, base stations have no chance to measure the channel effectively without some particular design.

The present disclosure proposes an improved solution for MU-MIMO. The basic idea is to propose a learning-based scheduling algorithm to show the massive MIMO gain. The solution may be applied to a wireless communication system including a UE and a base station. The UE can communicate through a radio access communication link with the base station. The base station can provide radio access communication links to UEs that are within its communication service cell. The base station may be, for example, an evolved node B (eNB) in LTE or a gNB in NR. Note that the communications may be performed between the UE and the base station according to any suitable communication standards and protocols. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 3:
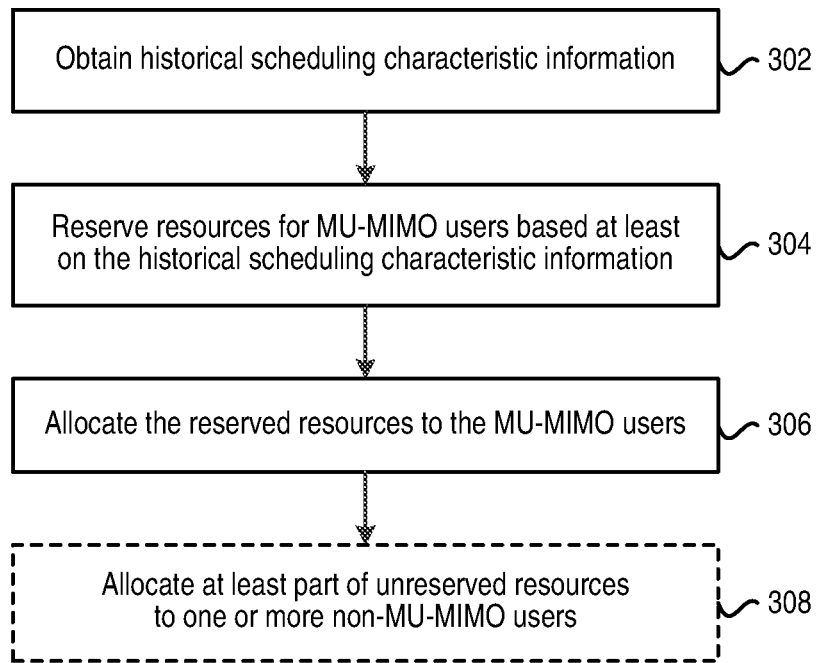
FIG. 3 is a flowchart illustrating a method implemented at a base station according to an embodiment of the disclosure.

Hereinafter, the solution will be described in detail with reference to FIGS. 3-9. FIG. 3 is a flowchart illustrating a method implemented at a base station according to an embodiment of the disclosure. At block 302, historical scheduling characteristic information is obtained. The historical scheduling characteristic information may refer to the information that indicates the characteristic(s) or merit(s) of historical scheduling events occurring at the base station. For example, block 302 may be implemented as block 402 of FIG. 4. That is, the historical scheduling characteristic information may be determined based on historical information related to historical scheduling events at block 402.

The historical information related to a historical scheduling event may include historical resource demand information and historical scheduling result information. The historical resource demand information indicates the resource demand in the historical scheduling event. For example, the historical resource demand information may include any one of or a combination of: the number of active users existing in a serving area of the base station, buffer status of the active users, or the like. The historical scheduling result information indicates the scheduling result(s) in the historical scheduling event. For example, the historical scheduling result information may include any one of or a combination of: the number of users scheduled in the historical scheduling event, the number of MU-MIMO users among the scheduled users, the number of non-MU-MIMO users among the scheduled users, the number of CCE candidates assigned in the historical scheduling event, the number of PRBs allocated in the historical scheduling event, the number of PRBs allocated to MU-MIMO users in the historical scheduling event, the number of PRBs allocated to non-MU-MIMO users in the historical scheduling event, an instantaneous throughput achieved in the historical scheduling event, or the like.

The historical information may be stored in a storage unit (e.g. a dedicated memory) of the base station. Optionally, the time duration for data effectiveness may be adjusted with respect to the available storage space and traffic scenarios. When there is no historical information for a base station (e.g. the base station is turned on for the first time), the base station may allocate resources by using various conventional scheduling algorithms. When sufficient historical information has been available, block 402 may be performed. The historical scheduling characteristic information determined at block 402 may vary depending on the requirement of block 304 or 403.

The historical scheduling characteristic information may be determined by using various data processing techniques such as statistical processing, pattern recognition, machine learning, or the like. The historical scheduling characteristic information may be determined as any one of or a combination of: traffic model information, bottleneck information, statistical information about the historical scheduling result information, or the like. The traffic model information may include any one of or a combination of: the number of users demanding dense traffic, the number of users with voice services, the number of users with small package services, the number of users with middle package services, or the like. For illustration purpose, an exemplary traffic model which may be obtained at block 302 is shown in FIG. 5. It is a typical traffic model from China mobile communications group Co., Ltd (CMCC). For example, the traffic model information may be determined by performing statistical processing on the historical resource demand information over a predetermined period of time (e.g. a sliding time window).

The bottleneck information indicates the bottleneck(s) of constrain(s) for scheduling users at the base station. For example, the bottleneck information may include any one of or a combination of: the maximum number of users capable of being scheduled by the base station (e.g. due to HW limitation), the maximum number of CCE candidates available for the base station, the maximum number of PRBs available for the base station, or the like. The statistical information about the historical scheduling result information may include any one of or a combination of: the average number of scheduled users, the average number of assigned CCE candidates, the average number of allocated PRBs, the average number of PRBs allocated to MU-MIMO users, the average number of PRBs allocated to non-MU-MIMO users, or the like. The above average numbers may be calculated over a predetermined period of time (e.g. a sliding time window). Note that the above examples for the statistical information are merely exemplary examples for illustration purpose and any other suitable statistical processing may be used instead.

Referring back to FIG. 3, at block 304, resources are reserved for MU-MIMO users based at least on the historical scheduling characteristic information. In this way, unfairness is introduced among UEs to enhance cell throughput without deteriorating legacy key performance indicators (KPIs). For example, block 304 may be implemented as blocks 304-1 to 304-4 of FIG. 6. At block 304-1, the number of the MU-MIMO users for which the resources are reserved is determined. As an exemplary example, the number of the MU-MIMO users may be determined as a first predetermined margin multiplied by a difference between the maximum number of users capable of being scheduled and the average number of scheduled users. This may be represented as:

nrOfUsersSchedRev=floor((nrOfUserCapSched−avgNrOfUserSched)*margin1), where nrOfUsersSchedRev denotes the number of the MU-MIMO users, nrOfUserCapSched denotes the maximum number of users capable of being scheduled, avgNrOfUserSched denotes the average number of scheduled users, and margin1 denotes the first predetermined margin which may be a safe margin value belonging to (0, 1).

At block 304-2, the number of CCE candidates reserved for the MU-MIMO users is determined. As an exemplary example, the number of the reserved CCE candidates may be determined as a second predetermined margin multiplied by a difference between the maximum number of CCE candidates and the average number of assigned CCE candidates. This may be represented as:

nrOfCceCandiRev=floor((nrOfMaxCceCandi−avgNrOfCceAssined)*margin2), where nrOfCceCandiRev denotes the number of the reserved CCE candidates, nrOfMaxCceCandi denotes the maximum number of CCE candidates, avgNrOfCceAssined denotes the average number of CCE candidates, and margin2 denotes the second predetermined margin which may be a safe margin value belonging to (0, 1).

At block 304-3, the number of PRBs reserved for the MU-MIMO users is determined. As an exemplary example, the number of the reserved PRBs may be determined as a third predetermined margin multiplied by a difference between the maximum number of PRBs and the average number of allocated PRBs. This may be represented as:

nrOfPrbRev=floor((nrOfAvailPrbs−avgNrOfPrbUsed)*margin3), where nrOfPrbRev denotes the number of the reserved PRBs, nrOfAvailPrbs denotes the maximum number of PRBs, avgNrOfPrbUsed denotes the average number of PRBs, and margin3 denotes the third predetermined margin which may be a safe margin value belonging to (0, 1). In the above examples for blocks 304-1 to 304-3, only the bottleneck information and statistical information is used to determine the reserved resources. However, the present disclosure is not limited to these examples and any suitable historical scheduling characteristic information mentioned above may be used to determine the reserved resources depending on the specific application scenario.

At block 304-4, CCE resources and PRBs are reserved based on the determined number of CCE candidates and the determined number of PRBs respectively. As an example, the PRBs within a fixed range corresponding to the determined number of PRBs may be reserved. For instance, if the determined number of PRBs is 40, then PRB 0 to PRB 39 may be reserved. Similarly, the CCE resources within a fixed range corresponding to the determined number of CCE candidates may be reserved. In this way, the MU and non-MU users can be multiplexed in a fixed frequency division instead of a random manner. The determination of the users, scheduling resource and radio resource at block 304-1 to 304-3 may be performed once for every time window and the resource reservation at block 304-4 may be performed per scheduling opportunity.

Figure 4:
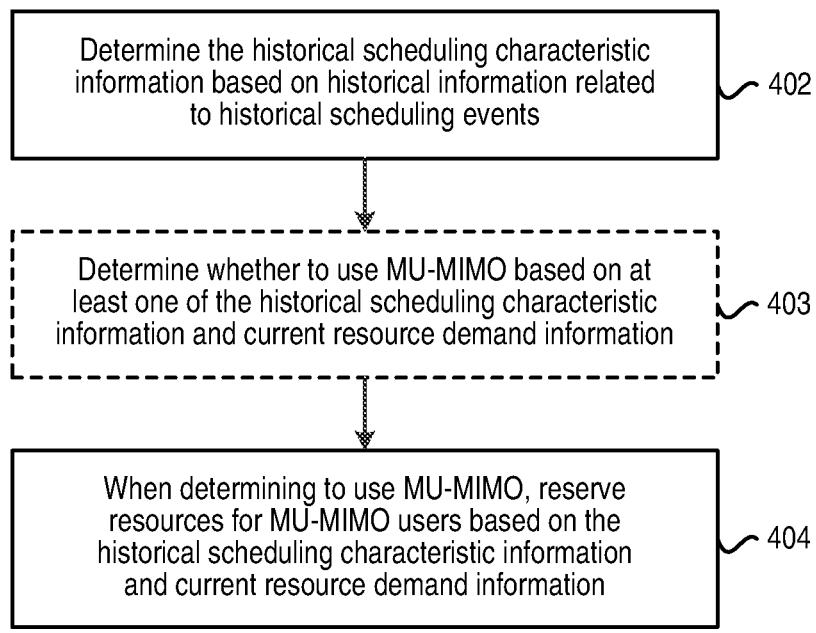
FIG. 4 is a flowchart for explaining the method of FIG. 3.
Figure 6:
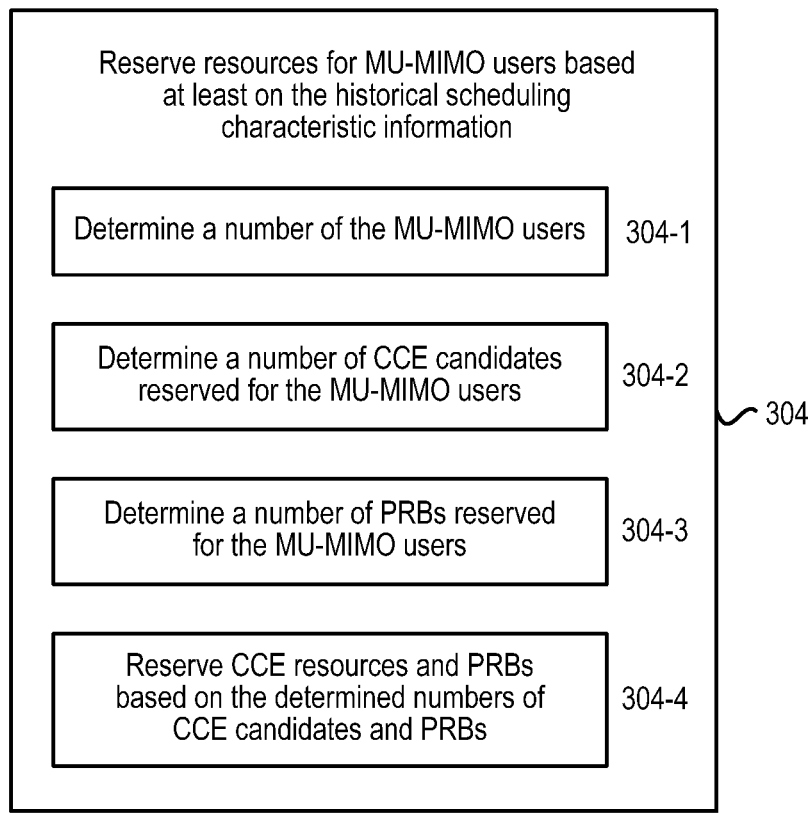
FIG. 6 is a flowchart for explaining the method of FIG. 3.

Optionally, the resources may be reserved for the MU-MIMO users based further on current resource demand information, as shown in block 404 of FIG. 4. That is, the resources may be reserved for the MU-MIMO users based on the historical scheduling characteristic information and current resource demand information. For example, the number of the CCE candidates/PRBs to be used according to the current resource demand information may be compared with the average number of assigned CCE candidates/allocated PRBs which is determined based merely on the historical scheduling characteristic information. If the difference between the two is greater than a predetermined difference value, then the average number of assigned CCE candidates/allocated PRBs may be modified based on the number of the CCE candidates/PRBs to be used. For example, a weighted sum of the average number of assigned CCE candidates/allocated PRBs and the number of the CCE candidates/PRBs to be used may be used as the modified resources. In this case, the determination of the users, scheduling resource and radio resource at block 304-1 to 304-3 may also be performed if the above difference between the two is greater than the predetermined difference value.

Optionally, the base station may determine whether to use MU-MIMO based on at least one of the historical scheduling characteristic information and current resource demand information, as shown in block 403 of FIG. 4. The resources may be reserved for the MU-MIMO users when it is determined to use MU-MIMO, as shown in block 404 of FIG. 4. As a first example, the base station may determine to use MU-MIMO when the following conditions are satisfied: 1) the number of users demanding dense traffic is above a first predetermined threshold; 2) the average number of PRBs allocated to MU-MIMO users is below a second predetermined threshold; and 3) the number of users with small package services is below a third predetermined threshold (e.g., there are not too many users with small package services). Note that some further conditions may be taken in the future, when new traffic demand appears. The first predetermined threshold may be set such that the condition 1) is satisfied when there are several MU users demanding dense traffic. Thus, the prerequisite for showing massive MIMO gain is relaxed to that there are a few UEs with big buffer. In this way, the limit of SRS resources is not critical to let massive MIMO benefit cell throughput.

As a second example, the base station may determine not to use MU-MIMO when one or more of following conditions are satisfied: the number of users demanding dense traffic is smaller than the first predetermined threshold (e.g., the present traffic is not dense, or there is no user demanding dense data traffic); the number of users with small package services is greater than the third predetermined threshold (e.g., there are too many users with small package services); and the number of active users is below a fourth predetermined threshold (e.g., there are only a few users accommodating in the serving cell of the base station).

In the above two examples, only historical scheduling characteristic information is used to determine whether to use MU-MIMO. As a third example, the base station may determine not to use MU-MIMO when the current resource demand information indicates one or more of following conditions: the number of users currently demanding dense traffic is smaller than the first predetermined threshold; the number of users currently with small package services is greater than the third predetermined threshold (e.g., there are too many users with small package services); and the number of the current active users is below a fourth predetermined threshold. As a fourth example, similar to the first example, the base station may determine to use MU-MIMO when the three conditions in the first example are satisfied. The difference only lies in that any one or more of the number of users demanding dense traffic, the average number of PRBs allocated to MU-MIMO users, and the number of users with small package services is modified based on the current resource demand information.

Figure 7:
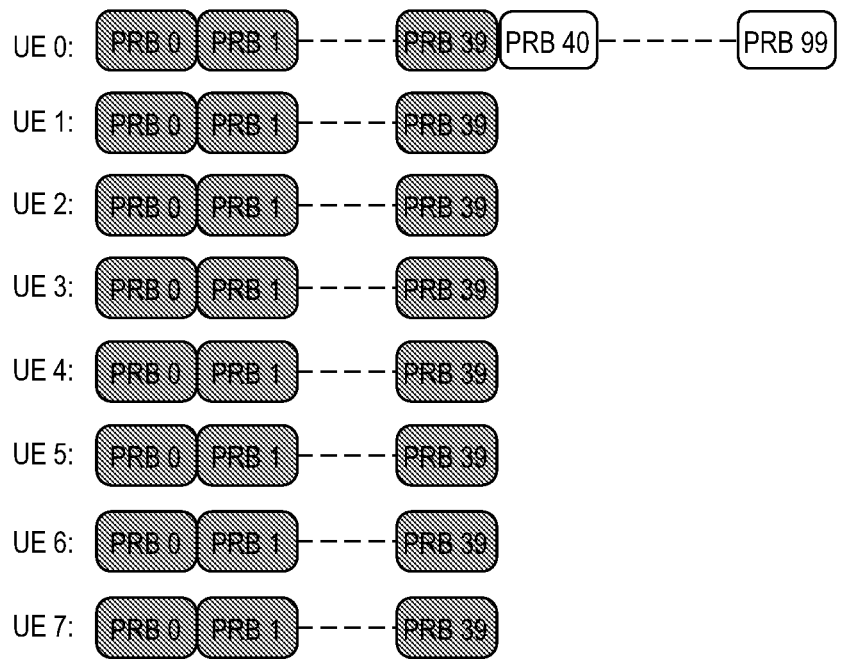
FIG. 7 illustrates an exemplary example for resource reservation according to an embodiment of the disclosure.

Referring back to FIG. 3, at block 306, the reserved resources are allocated to the MU-MIMO users. For example, the reserved resources may be allocated to the MU users as often as possible and as much as possible. In this way, SRS resource can be released earlier and then assigned to next ones. In addition, the convergence of link adaptation (LA) for MU users can be accelerated. FIG. 7 illustrates an exemplary example for resource reservation according to an embodiment of the disclosure. Suppose the reserved resources at blocks 304-1 to 304-3 are represented as (nrOfUsersSchedRev, nrOfCceCandiRev, nrOfPrbRev). Then, in the example of FIG. 7, the reserved resource are represented as (8, 8, 40). In this case, the first 40 PRBs are always assigned to MU users and PRB 40 to PRB 99 are allocated to other user(s). If the rough calculation mentioned above is used, then the expected massive MIMO gain is:

40/100*8+60/100=3.8.

Thus, the cell throughput can be enhanced by 3.8/1.7*100%=223.5%. This means massive MIMO can be significantly enhanced and customers' experience can be improved. Optionally, at block 308, at least part of unreserved resources is allocated to one or more non-MU-MIMO users. It should be noted that two blocks shown in succession in the figures may, in fact, be executed substantially concurrently, or the blocks may sometimes be executed in the reverse order, depending upon the functionality involved.

Figure 8:
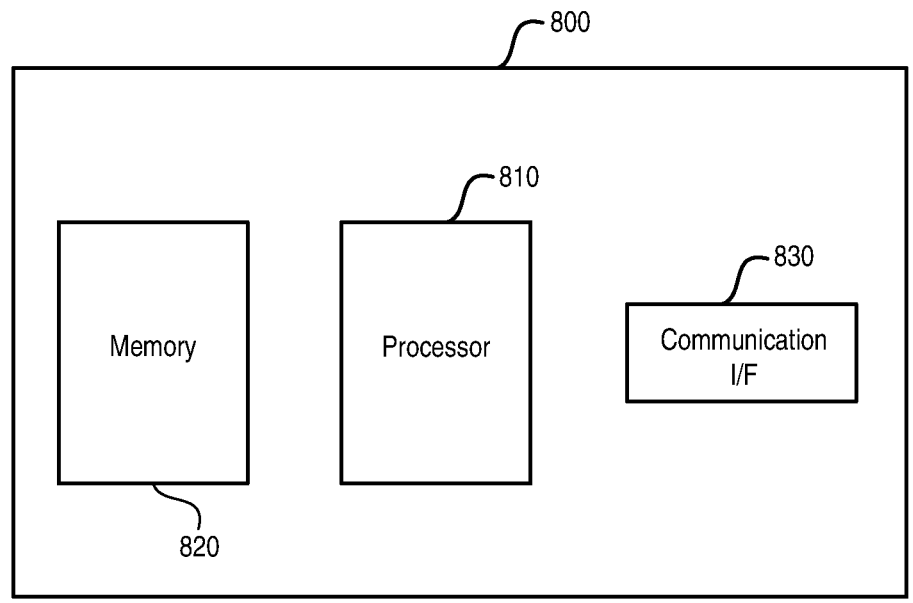
FIG. 8 is a block diagram showing an apparatus suitable for use in practicing some embodiments of the disclosure.

FIG. 8 is a block diagram showing an apparatus suitable for use in practicing some embodiments of the disclosure. For example, the base station described above may be implemented through the apparatus 800. As shown, the apparatus 800 may include a processor 810, a memory 820 that stores a program, and a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
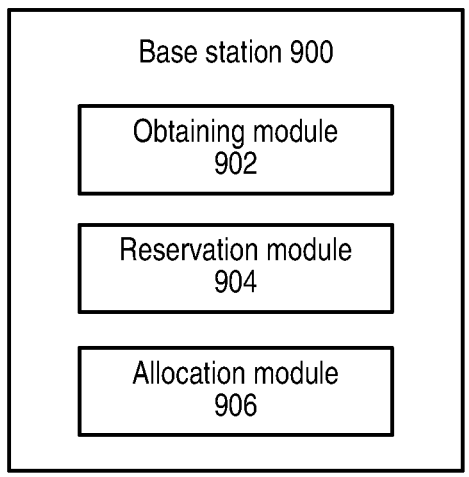
FIG. 9 is a block diagram showing a base station according to an embodiment of the disclosure.

FIG. 9 is a block diagram showing a base station according to an embodiment of the disclosure. As shown, the base station 900 comprises an obtaining module 902, a reservation module 904 and an allocation module 906. The obtaining module 902 may be configured to obtain historical scheduling characteristic information, as described above with respect to block 302. The reservation module 904 may be configured to reserve resources for MU-MIMO users based at least on the historical scheduling characteristic information, as described above with respect to block 304. The allocation module 906 may be configured to allocate the reserved resources to the MU-MIMO users, as described above with respect to block 306.

Optionally, the reservation module 904 may be configured to reserve resources for MU-MIMO users based further on current resource demand information. The allocation module 906 may be further configured to allocate at least part of unreserved resources to one or more non-MU-MIMO users. The base station 900 may further comprise a determination module configured to determine whether to use MU-MIMO based on at least one of the historical scheduling characteristic information and current resource demand information. The reservation module 904 may be configured to reserve the resources for the MU-MIMO users when the determination module determines to use MU-MIMO. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a base station, comprising:
    obtaining historical scheduling characteristic information;
    reserving resources for multi-user multiple input multiple output (MU-MIMO) users based at least on the historical scheduling characteristic information;
    allocating the reserved resources to the MU-MIMO users; and
    determining to use MU-MIMO when the following conditions are satisfied:
        a number of users demanding dense traffic is above a first predetermined threshold;
        an average number of physical resource blocks (PRBs) allocated to MU-MIMO users is below a second predetermined threshold; and
        a number of users with small package services is below a third predetermined threshold.

2. The method according to claim 1, wherein the resources are reserved for the MU-MIMO users based further on current resource demand information.

3. The method according to claim 1, wherein reserving the resources for the MU-MIMO users comprises:
    determining a number of the MU-MIMO users for which the resources are reserved;
    determining a number of control channel element (CCE) candidates reserved for the MU-MIMO users;
    determining a number of physical resource blocks (PRBs) reserved for the MU-MIMO users; and
    reserving CCE resources and PRBs based on the determined number of CCE candidates and the determined number of PRBs, respectively.

4. The method according to claim 3, wherein the number of the MU-MIMO users is determined as a first predetermined margin multiplied by a difference between a maximum number of users capable of being scheduled and an average number of scheduled users;
    wherein the number of the reserved CCE candidates is determined as a second predetermined margin multiplied by a difference between a maximum number of CCE candidates and an average number of assigned CCE candidates; and
    wherein the number of the reserved PRBs is determined as a third predetermined margin multiplied by a difference between a maximum number of PRBs and an average number of allocated PRBs.

5. The method according to claim 1, further comprising:
    allocating at least part of unreserved resources to one or more non-MU-MIMO users.

6. The method according to claim 1, further comprising:
   determining whether to use MU-MIMO based on at least one of the historical scheduling characteristic information and current resource demand information; and
   wherein the resources are reserved for the MU-MIMO users when it is determined to use MU-MIMO.

7. The method according to claim 6, wherein it is determined not to use MU-MIMO when one or more of the following conditions are satisfied:
   a number of users demanding dense traffic is smaller than a first predetermined threshold;
   a number of users with small package services is greater than a third predetermined threshold; and
   a number of active users is below a fourth predetermined threshold.

8. The method according to claim 1, wherein obtaining the historical scheduling characteristic information comprises:
   determining the historical scheduling characteristic information based on historical information related to historical scheduling events.

9. The method according to claim 8, wherein the historical information related to a historical scheduling event comprises historical resource demand information and historical scheduling result information.

10. The method according to claim 9, wherein the historical resource demand information comprises one or more of:
    number of active users existing in a serving area of the base station; and
    buffer status of the active users.

11. The method according to claim 9, wherein the historical scheduling result information comprises one or more of:
    number of users scheduled in the historical scheduling event;
    a number of MU-MIMO users among the scheduled users;
    a number of non-MU-MIMO users among the scheduled users;
    a number of CCE candidates assigned in the historical scheduling event;
    a number of PRBs allocated in the historical scheduling event;
    a number of PRBs allocated to MU-MIMO users in the historical scheduling event; a number of PRBs allocated to non-MU-MIMO users in the historical scheduling event; and
    an instantaneous throughput achieved in the historical scheduling event.

12. The method according to claim 1, wherein the historical scheduling characteristic information comprises one or more of:
    traffic model information;
    bottleneck information; and
    statistical information about the historical scheduling result information.

13. The method according to claim 12, wherein the traffic model information comprises one or more of:
    a number of users demanding dense traffic;
    a number of users with voice services;
    a number of users with small package services; and
    a number of users with middle package services.

14. The method according to claim 12, wherein the bottleneck information comprises one or more of:
    a maximum number of users capable of being scheduled by the base station;
    a maximum number of CCE candidates available for the base station; and
    a maximum number of PRBs available for the base station.

15. The method according to claim 12, wherein the statistical information comprises one or more of:
    an average number of scheduled users;
    an average number of assigned CCE candidates;
    an average number of allocated PRBs;
    an average number of PRBs allocated to MU-MIMO users; and
    an average number of PRBs allocated to non-MU-MIMO users.

16. A base station comprising:
    at least one processor; and
    at least one memory, the at least one memory containing instructions executable by the at least one processor, whereby the base station is operative to:
    obtain historical scheduling characteristic information;
    reserve resources for multi-user multiple input multiple output, MU-MIMO, users, based at least on the historical scheduling characteristic information;
    allocate the reserved resources to the MU-MIMO users; and
    determining to use MU-MIMO when the following conditions are satisfied:
      a number of users demanding dense traffic is above a first predetermined threshold;
      an average number of physical resource blocks (PRBs) allocated to MU-MIMO users is below a second predetermined threshold; and
      a number of users with small package services is below a third predetermined threshold.

17. The base station according to claim 16, wherein the resources are reserved for the MU-MIMO users based further on current resource demand information.

18. A non-transitory computer readable storage medium storing instructions which when executed by at least one processor of a base station, cause the at least one processor to:
    obtain historical scheduling characteristic information;
    reserve resources for multi-user multiple input multiple output (MU-MIMO) users based at least on the historical scheduling characteristic information;
    allocate the reserved resources to the MU-MIMO users; and
    determining to use MU-MIMO when the following conditions are satisfied:
      a number of users demanding dense traffic is above a first predetermined threshold;
      an average number of physical resource blocks (PRBs) allocated to MU-MIMO users is below a second predetermined threshold; and
      a number of users with small package services is below a third predetermined threshold.

* * * * *